US012692117B2

(12) United States Patent
Schneider

(10) Patent No.: US 12,692,117 B2
(45) Date of Patent: Jul. 28, 2026

(54) DEVICE AND METHOD FOR STACKING VALUE DOCUMENTS

(71) Applicant: GIESECKE+DEVRIENT CURRENCY TECHNOLOGY GMBH, Munich (DE)

(72) Inventor: Stefan Schneider, Kirchheim (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 18/853,531

(22) PCT Filed: Mar. 31, 2023

(86) PCT No.: PCT/DE2023/100250

§ 371 (c)(1),
(2) Date: Oct. 2, 2024

(87) PCT Pub. No.: WO2023/198245

PCT Pub. Date: Oct. 19, 2023

(65) Prior Publication Data

US 2025/0223130 A1 Jul. 10, 2025

(30) Foreign Application Priority Data

Apr. 12, 2022 (DE) ..................... 10 2022 001 250.2

(51) Int. Cl.
*B65H 29/40* (2006.01)
*G07D 11/16* (2019.01)

(52) U.S. Cl.
CPC ............. *B65H 29/40* (2013.01); *G07D 11/16* (2019.01); *B65H 2404/63* (2013.01); *B65H 2404/657* (2013.01)

(58) Field of Classification Search
CPC .......................... B65H 29/40; B65H 2404/657
See application file for complete search history.

(56) References Cited

U.S. PATENT DOCUMENTS 4,244,565 A * 1/1981 Geier ..................... B65H 43/00 271/187
4,647,032 A 3/1987 Oba
(Continued)

FOREIGN PATENT DOCUMENTS

DE 102007028954 B3 * 7/2008 ............. B65H 29/40
DE 10140101 B4 * 10/2013 ............. B65H 29/40
JP S62153050 A 7/1987

OTHER PUBLICATIONS

International Search Report from corresponding PCT Application No. PCT/DE2023/100250, Jun. 20, 2023.

*Primary Examiner* — Patrick Cicchino
(74) *Attorney, Agent, or Firm* — Workman Nydegger

(57) ABSTRACT

A device and a method are for stacking value documents. The device includes a stacker unit for receiving the value documents and a conveyor unit for conveying the value documents into the stacker unit. The stacker unit has a rotatable stacker wheel for receiving the value documents, wherein the rotatable stacker wheel has a plurality of deflectable stacker wheel segments which are provided along the circumference of the rotatable stacker wheel in a mutually spaced manner. Each of the deflectable stacker wheel segments defines a respective receiving region for receiving at least one of the value documents. The device additionally has a deflecting unit which is designed to deflect each stacker wheel segment individually to thus modify the size of the respective receiving region associated with the stacker wheel segment.

17 Claims, 7 Drawing Sheets

(56) References Cited

U.S. PATENT DOCUMENTS

| | | | | | |
|---|---|---|---|---|---|
| 5,249,791 | A * | 10/1993 | Belanger | B65H 29/40 | 271/182 |
| 5,803,705 | A * | 9/1998 | Keyes | B65H 29/40 | 414/794 |
| 5,975,525 | A * | 11/1999 | Hartmann | B65H 29/40 | 270/39.09 |
| 2011/0037219 | A1* | 2/2011 | Wylie | B65H 29/40 | 271/220 |

* cited by examiner

DEVICE AND METHOD FOR STACKING VALUE DOCUMENTS

BACKGROUND

The present invention relates to a device for stacking value documents and a method for stacking value documents.

Stacking devices for value documents, in particular spiral stackers, are used today for stacking value documents such as banknotes. For example, stacking devices for value documents are used in processing devices, e.g. checking, counting or sorting devices. Here, the value documents are first separated from a stack to enable the individual value documents to be checked, counted or sorted. The value documents are then stacked again by the stacker device in order to provide them in stacked form for further processing.

Within the stacker device, the value documents are transported to the corresponding stacker compartments of a stacker by means of a suitable transport unit, for example conveyor belts. The actual arrival time of the value documents arriving individually and one after the other at the stacker may be slightly delayed in relation to a target arrival time of the value documents at the stacker due to their separation or transportation. There is then a risk that such a delayed value document, instead of being inserted into the corresponding stacker compartment, will hit the stacker fingers delimiting the stacker compartment, causing the value document to be damaged, or will be inserted into the same stacker compartment with another value document, or will not enter the stacker at all but will fly past it.

SUMMARY

It is an object of the present invention to make the stacking process more reliable when stacking value documents.

According to one aspect, a device for stacking value documents or a stacking device for value documents, for example banknotes, is provided. The device comprises a stacker unit for receiving the value documents and, possibly, a conveyor unit for conveying the value documents into the stacker unit. However, the conveyor unit can also be provided by a value document processing device in which the stacking device is installed. The stacker unit comprises a rotatable stacker wheel for receiving the value documents, wherein the rotatable stacker wheel has a plurality of deflectable stacker wheel segments which are arranged at a distance from one another along a circumference of the rotating stacker wheel. The deflectable stacker wheel segments each define a receiving region for receiving one of the value documents conveyed into the stacker unit. The device further comprises a deflecting unit which is designed to deflect each of the stacker wheel segments individually in order to thus modify the size, in particular the width, of a respective receiving region associated with a stacker wheel segment, in particular to enlarge it. In particular, the deflection of the respective stacker wheel segment increases the width of the receiving region associated with the respective stacker wheel segment into which the respective value document is to be conveyed. The width corresponds to the size of the respective receiving region in the direction perpendicular to the value document plane of the value document to be conveyed into the respective receiving region (at the time the value document enters the respective receiving region/entry region of the stacker wheel).

The receiving region associated with the respective stacker wheel segment is the receiving region of the stacker wheel that lies directly in front of the respective stacker wheel segment when viewed along the direction of rotation of the stacker wheel. It is the receiving region that the respective stacker wheel segment-viewed along the direction of rotation of the rotatable stacker wheel-defines towards the rear.

With such a device for stacking value documents, it is possible to make the receiving of value documents more reliable during the rotation of the stacker wheel in the stacker wheel. For this purpose, the size or width of the receiving region is increased for all or individually for certain value documents fed to the stacker wheel. Since the receiving region is only briefly located on the transport path of the value document due to the rotation of the stacker wheel and is open there to receive a value document transported to the stacker wheel, the deflection of the stacker wheel segment and the associated enlargement of the receiving region extends a receiving period in which a value document can be fed to a receiving region or stacker compartment associated with the stacker wheel segment during the rotation of the stacker wheel. In other words, the insertion time window for inserting the value document into this associated receiving region is extended, as the deflection of the stacker wheel segment means that the receiving region is available longer for inserting the respective value document. This means that even a delayed value document can still be safely inserted into the receiving region of the stacker wheel.

The device substantially comprises the stacker unit, possibly the conveyor unit and the deflecting unit. The stacker unit of the device comprises the rotatable stacker wheel, which rotates (continuously) about an axis of rotation during operation of the device. The deflectable stacker wheel segments can be arranged at equal distances from each other along the circumference of the rotatable stacker wheel. The stacker wheel segments can be provided in the form of elastically deformable or bendable projections or stacker wheel fingers, which extend away from the stacker wheel in the radial and possibly also in the circumferential direction. This will be explained in greater detail in the description of the figures.

The device may also have a stacking tray on which the value documents stacked by the stacker unit can be stacked. The stacking tray can be provided by a stacking compartment from which the stack of value documents formed can be removed. The stacker unit can have a stripper by means of which the value documents received in the stacker wheel or in the receiving regions of the stacker wheel are stripped out due to the rotational movement of the stacker wheel and are thereby stacked on the stacking tray.

The invention also relates to a value document processing device which has the stacking device according to the invention for stacking value documents, and to a device for separating value documents from an output stack and for feeding the separated value documents to the stacking device, for example with the aid of a transport device of the value document processing device.

In each case, two adjacent stacker wheel segments can define a receiving region, the size or width of which is modified by deflecting one of these stacker wheel segments. In one example, the stacker wheel and the stacker wheel segments arranged on its circumference rotate around the axis of rotation of the stacker wheel, so that the individual stacker wheel segments are each moved past or swept past the deflecting unit individually and in succession. The deflecting unit can deflect a stacker wheel segment as it moves past or sweeps past it, so that this stacker wheel segment is pushed or deflected in the direction of the inside of the stacker wheel. A neighboring stacker wheel segment, which has already been moved past the deflecting unit immediately beforehand, is not (or no longer) deflected and is therefore further away from the inside of the stacker wheel. As a result, the receiving region is effectively enlarged and the receiving period for receiving a value document is extended, as described above.

The receiving region can therefore be delimited by two adjacent stacker wheel segments. The receiving region can thus define an entry opening through which the value document can be fed into a stacker wheel compartment associated with the receiving region. In particular, the receiving region can be defined by an inner side or by a free end of a first stacker wheel segment and an outer side or rear side of an adjacent second stacker wheel segment. Each receiving region can correspond to an associated stacker wheel compartment.

The stacker unit can be designed in the form of a spiral stacker, wherein the stacker wheel compartments are arranged in a spiral within the rotating stacker wheel. The value documents enter the stacker wheel compartments, wherein it can be provided that only a single value document enters a stacker wheel compartment with each rotation of the stacker wheel. In this way, each of the stacker wheel compartments can be filled with a single value document during one rotation of the stacker wheel. With further rotation, the value documents are stripped from the stacker wheel by means of a stripper and deposited on a stacking tray in the form of a stack. The stacker wheel can be designed in this way for stacking the value documents on the tray, wherein the value documents are stacked, for example, in an output compartment of a value document processing device, for example a sorting device.

The deflecting unit is arranged in the entry region of the stacker wheel and can deflect the stacker wheel segments individually one after the other, in particular elastically, during the rotation of the stacker wheel. This can be done mechanically, for example by mechanical contact between the deflecting unit and the respective stacker wheel segment. In this case, a deflection movement of the respective stacker wheel segment can be caused by a contact force which a deflection element of the deflecting unit exerts on the stacker wheel segment, whereby this stacker wheel segment is deflected elastically, e.g. displaced and/or deformed.

The conveyor unit is designed to convey the individual value documents into the stacker unit of the device. The conveyor unit can be connected to a transport device of the value document processing device, which transfers the value documents to the conveyor unit. The value documents are preferably fed individually and one after the other to the stacker unit by means of the conveyor unit, so that only one value document at a time can reach a receiving region and thus an associated stacker wheel compartment. The time of arrival of the value document at the stacker wheel therefore determines the receiving region into which this value document arrives. If a value document arrives at the receiving region with a (time) delay, the deflection of the corresponding stacker wheel segment can enable the resulting extension of the receiving period in an associated receiving region, so that the value document still arrives in the receiving region intended for this value document (and does not collide with the stacker wheel segment or finger).

The device according to the invention can therefore use the deflecting unit at the entry of the stacker wheel in order to deflect the elastically deformable stacker wheel segments or stacker wheel fingers and thus briefly expand each of the receiving regions or stacker wheel compartments (the rear wall of which forms the stacker wheel segment) that are moved past the deflection element one after the other. The deflection movement can take place in the direction of the inside of the stacker wheel, for example with a radial directional component towards the stacker wheel rotation axis. As a result, the entry opening of the receiving region that is to receive the respective value document can be enlarged, which in turn ensures the insertion of a time-delayed value document. The other stacker wheel segments can remain in their normal position or starting position. If the deflected stacker wheel segment is moved out of contact or engagement with the deflecting unit or deflection element as the stacker wheel continues to rotate, the deflected stacker wheel segment moves elastically back to its normal position or starting position. Therefore, after the deflection of the rear stacker wheel segment, the entry opening of the receiving region is the same size as before the deflection.

In particular, the deflecting unit is designed to deflect the stacker wheel segments arranged along a circumference of the rotatable stacker wheel (which come into contact with the deflecting unit one after the other in time due to the rotation of the stacker wheel) one after the other in time and thereby modify the size of the receiving region associated with the respective stacker wheel segment. This can be carried out (selectively only) for some of the deflectable stacker wheel segments of the rotatable stacker wheel or for each of the deflectable stacker wheel segments of the rotatable stacker wheel.

The stacker wheel segments can be evenly distributed around the circumference of the stacker wheel. As the stacker wheel segments are moved past the deflecting unit one after the other due to the rotation of the stacker wheel, they also only come into contact with the deflecting unit one at a time, so that only a single stacker wheel segment is deflected at any given time, while the remaining stacker wheel segments of the plurality of stacker wheel segments are not deflected.

The deflection element of the deflecting unit can be a static deflection element which is arranged in such a way that it comes into contact with each of the deflectable stacker wheel segments of the rotatable stacker wheel in turn during the rotation of the stacker wheel in order to deflect it and thereby modify the size of the receiving region associated with the respective stacker wheel segment. In particular, the static deflection element is (permanently) mechanically fixed during operation of the value document stacking performed by the device. However, it may be provided that it can be adjusted within the device before the stacking of the value documents, for example by means of a presetting. In the case of a static or fixed deflection element, each stacker wheel segment is deflected by the same deflection distance, whereby the size of each receiving region defined on the circumference is modified equally when the respective associated stacker wheel segment is deflected. In other words, the static or fixed deflection element is not actively moved during the stacking of the value documents and thus during the rotation of the stacker wheel, so that it deflects each stacker wheel segment by the same distance and thus expands the entry opening of each of the successively arriving receiving regions equally. The position of the deflection element can, for example, be adjustable in order to find an optimum position of the deflection element offline, i.e. when the operation of the device is interrupted.

However, it may also be provided that the stacker wheel segments or at least some of the stacker wheel segments can be deflected by a different amount. In other words, the deflecting unit, in particular the deflection element of the deflecting unit, can be actively and dynamically movable in order to select a position of the deflection element individually for the respective value document to be received, for example depending on a transport position of the respective value document determined by a detection unit before entry into the stacker wheel. In one example, only deflection or non-deflection can be decided dynamically and individually for the respective value document. Additionally or alternatively, in another example, a deflection distance of the deflection element can also be selected individually for the respective value document, for example as a function of a transport position and/or a delay of the respective value document before it enters the stacker wheel, wherein the transport position and/or the delay can in turn be determinable by the detection unit.

In particular, the plurality of stacker wheel segments comprises a first stacker wheel segment with a first associated receiving region and a second stacker wheel segment with a second associated receiving region, which are arranged at a distance from one another along the circumference of the rotatable stacker wheel, wherein the deflecting unit is designed to deflect the first stacker wheel segment and the second stacker wheel segment differently one after the other in such a way that a size or width of the first receiving region when the first stacker wheel segment is deflected differs from a size or width of the second receiving region when the second stacker wheel segment is deflected. The first and second stacker wheel segments can be adjacent to each other along the circumference of the stacker wheel or there can be other stacker wheel segments between them.

In other words, the deflecting unit can deflect the individual stacker wheel segments by a different deflection distance in order to individually adjust the size or width of each receiving region. This corresponds to the previously described example of an actively dynamically movable deflecting unit, in particular an actively dynamically movable deflection element of the deflecting unit.

According to one embodiment, the deflecting unit is designed to deflect the deflectable stacker wheel segments in the direction of an inner region of the rotating stacker wheel.

The stacker wheel can substantially have a disk shape, wherein the individual stacker wheel segments are arranged around the circumference of the stacker wheel. The deflectable stacker wheel segments can each have a freely movable end. The inner region can be a region formed directly around the axis of rotation of the stacker wheel. In particular, the inner region can include the axis of rotation and thus the center of the stacker wheel. The direction of movement of the stacker wheel segments when they are deflected by the deflecting unit can thus have a radial directional component, so that the stacker wheel segments are deflected substantially in a radial direction to the rotating stacker wheel.

In particular, the rotatable stacker wheel has an axis of rotation fixed within the device, wherein the stacker wheel and thus the deflectable stacker wheel segments provided on the circumference of the stacker wheel can be rotated about the fixed axis of rotation at a predeterminable rotational speed.

The rotational speed can be constant if the stacker wheel is a continuously rotating stacker wheel. The rotational speed can be adjusted for a specific application. Due to the fixed axis of rotation, the stacker wheel is fixed so that it can rotate relative to the device. The deflecting unit, on the other hand, can be at least partially movable relative to the device or can have a deflection element movable relative to the device. The deflecting unit can, for example, be arranged adjacent to or on a guide element fixed within the device and the movable deflection element can be movable relative to the guide element. As a movable element within the device, the deflection element can cause the individual stacker wheel segments to deflect.

In particular, the deflecting unit is designed to deflect the deflectable stacker wheel segments relative to the fixed axis of rotation of the rotating stacker wheel in such a way that a distance between the stacker wheel segments and the fixed axis of rotation is (temporarily) reduced. In other words, the stacker wheel segments, for example at least one portion of the stacker wheel segments, can be deflected towards the inside of the stacker wheel and thus in the direction of the fixed axis of rotation. This reduces the distance between at least the deflected portions of the stacker wheel segments. When deflected, the stacker wheel segments can be pushed towards the inside of the stacker wheel by the deflecting unit.

In particular, the deflecting unit can have a movable deflection element which can be transferred from a non-deflecting, i.e., passive state (not deflecting the respective stacker wheel segment) to a deflecting, i.e., active state (deflecting the respective stacker wheel segment), wherein the deflection element (only) comes into contact with an individual one of the deflectable stacker wheel segments in the deflecting state in order to deflect this individual deflectable stacker wheel segment (from its normal position). In the non-deflecting state, the deflection element does not come into contact with any of the deflectable stacker wheel segments. In particular, in the deflecting state, the deflection element comes into contact with an individual one of the deflectable stacker wheel segments arranged along the circumference of the stacker wheel in order to deflect this stacker wheel segment, wherein the individual stacker wheel segment may have one or more deflectable and/or deformable stacker wheel fingers.

The deflection element can thus form a movable part of the deflecting unit, which can be moved relative to the stacker wheel. In the non-deflecting state, it can be provided that the deflection element cannot touch the passing stacker wheel segment and therefore cannot deflect. Furthermore, it can be provided that the deflection element can only touch and thus deflect the passing stacker wheel segment in the deflecting state. In the event of touch or contact between the deflection element and the stacker wheel segment, the stacker wheel segment sweeps or slides against the deflection element, since the stacker wheel segment moves with the rotating stacker wheel.

The deflecting unit can have an actuator that can transfer the deflection element from the non-deflecting state to the deflecting state. The actuator can be designed as a switching magnet, for example as a rotary magnet. The movable deflection element can be provided in the form of a movable plate or flap, which is arranged rotatably with respect to a non-movable part of the deflecting unit and/or with respect to the above-mentioned guide element. In this case, a hinge movement can take place between the guide element and the deflection element in order to transfer the deflection element from the non-deflecting state to the deflecting state.

In particular, an outer side of the respective deflectable stacker wheel segment forms a rear delimitation of the respective receiving region, or a delimitation of said respective receiving region that follows the respective receiving region along the direction of rotation of the stacker wheel.

A stacker wheel segment running ahead of the respective receiving region along the direction of rotation of the stacker wheel, in particular its inner side or its freely movable end, defines a front delimitation of the receiving region, or a delimitation of said receiving region running ahead of the respective receiving region along the direction of rotation of the stacker wheel. The freely movable end of the respective stacker wheel segment running ahead defines an outer end of the respective receiving region.

The stacker wheel segments can overlap in portions in the circumferential direction, wherein a receiving region of a certain size is always formed by two adjacent (along the circumference of the stacker wheel) stacker wheel segments. The previously mentioned entry opening of the receiving region can be formed by the freely movable end or the inside of a first stacker wheel segment and the outside or rear of a subsequent, adjacent, second stacker wheel segment, which may just be deflected by the deflecting unit.

According to one embodiment, each stacker wheel segment of the plurality of deflectable stacker wheel segments comprises at least two deflectable and/or deformable stacker wheel fingers. In particular, the stacker wheel fingers are arranged along the circumference of the stacker wheel at substantially the same azimuthal position of the stacker wheel and are spaced apart from one another along the axis of rotation of the stacker wheel. The deflecting unit is designed to simultaneously deflect the at least two stacker wheel fingers of the respective stacker wheel segment in order to thus modify or increase the size or width of the receiving region associated with the respective stacker wheel segment.

A stacker wheel segment can, for example, have four stacker wheel fingers, which together at least partially define the receiving region. The stacker wheel fingers can have freely movable ends. For example, the free ends or the inner sides of the stacker wheel fingers of the first stacker wheel segment form the upper delimitation of a receiving region and the outer sides or rear sides of the stacker wheel fingers of the second stacker wheel segment form the lower delimitation of this receiving region. Other configurations of the stacker wheel segments are possible.

In particular, the receiving region defines an entry region of the stacker wheel through which a value document can be fed to a stacker wheel compartment of the rotating stacker wheel. The entry region can be an entry opening. The entry region can have a specific size or width. The size or width of the entry region can be modified by deflecting a stacker wheel segment defining the entry region.

In particular, the device also has a control unit which is designed to cause the deflecting unit, in particular the movable deflection element, to deflect the respective stacker wheel segment, in particular to control the deflecting unit in such a way that a single stacker wheel segment of the plurality of stacker wheel segments is deflected. The control unit is designed to cause the deflecting unit to transfer the respective stacker wheel segment from the non-deflecting state to the deflecting state, in which it comes into contact with one of the deflectable stacker wheel segments in order to deflect it.

The control unit can be designed to decide for one or more (directly successive) value documents whether or not to cause the deflecting unit to deflect the respective stacker wheel segment, into the associated receiving region of which the respective value document is conveyed. The control unit can make the decision as to whether or not to cause the deflecting unit to deflect the respective stacker wheel segment, e.g., depending on any delay of the respective value document conveyed into the stacker unit—and possibly additionally depending on the delays of other value documents conveyed into the stacker unit before the respective value document, for example on the basis of their mean delay value.

The occurring delay of the respective value document is a time delay of the respective value document compared to an expected arrival time of the respective value document at a certain transport position of the value document, which is located along the transport path of the value documents in front of the stacker unit. The actual arrival time or delay of the respective value document transported into the stacker unit can be detected by means of a detection unit (e.g. light barrier), which is arranged on the transport path of the value document in front of the stacker unit, in particular to such an extent in front of the stacker unit that the delay of the respective value document can be detected in good time in order to initiate deflection if necessary.

The deflection of a stacker wheel segment to modify the size of a receiving region associated with the stacker wheel segment can take place as a function of the detected delay of the value document. The control unit can control the deflecting unit so that the deflection element of the deflecting unit is transferred to the deflected state in order to deflect the corresponding stacker wheel segment if it is detected that the one value document is transported with a delay (so that it arrives delayed in the entry region of the stacker wheel), i.e. the actual arrival time deviates from a target arrival time. The control unit may also control the deflecting unit in such a way that the deflection element of the deflecting unit remains in the non-deflecting state in order to prevent the corresponding stacker wheel segment from being deflected if it is determined that the detected position of the one value document corresponds to the target position or deviates from it by less than a predetermined threshold amount. In one example, the control unit can only differentiate between a deflection and a non-deflection of the stacker wheel segment and can control the deflecting unit accordingly.

According to one embodiment, the control unit is designed to variably control the deflecting unit in such a way that the respective stacker wheel segment of the plurality of deflectable stacker wheel segments is deflected by a variable deflection distance. The variable deflection distance can be preset by the operator or automatically determined by the control unit for the respective value document. The control unit can determine the variable deflection distance, for example depending on the delay of the respective value document (and possibly depending on the delays of other value documents conveyed into the stacker wheel before the respective value document), for example on the basis of a mean delay value thereof.

The control unit can control the deflecting unit so that the deflection element of the deflecting unit is transferred to the deflected state by a certain amount or angle corresponding to the deflection distance of the stacker wheel segment, in order to deflect the corresponding stacker wheel segment by the specified deflection distance when it is detected that one value document arrives with a delay. The deflection distance can be set as a function of the exact current delay of the respective value document. For example, the delay is determined using the arrival time of a front edge of one value document at the detection device, wherein the time difference by which this deviates from the target arrival time is determined.

According to one embodiment, the receiving region for receiving the one value document is defined by an outer side or rear side of the individual deflected stacker wheel segment and an adjacent non-deflected stacker wheel segment.

When entering the receiving region, the one value document is thus guided past the outside or rear of the deflected stacker wheel segment. The one value document is also guided past under the freely movable end of the adjacent, non-deflected stacker wheel segment, which has already passed the deflection element.

The device according to the invention improves the stacking process and eliminates problems that are conventionally associated with the synchronization of the individual receiving regions or stacker wheel compartments to the theoretical removal time of the value documents. By enlarging a receiving region when feeding the value document, the insertion time window (receiving period) that remains for successfully feeding the value document into the associated receiving region can be extended. The deflecting unit located at the entry of the respective receiving region is designed in such a way that the possible insertion region can be enlarged in such a way that a movable deflection element arranged radially to the stacker wheel prevents the elastically deformable stacker wheel segments from continuing to move on their original circular path, thus keeping the respective preceding receiving region open for longer. This can be controlled depending on the time of arrival of an asynchronously moving (e.g. delayed) value document. The time of arrival of the front edge of the value document at the detection device or transport light barrier of the upstream conveyor unit can be used as the control variable. A fast-switching magnet (e.g. a rotary magnet) can be used as the actuator for actuating the deflection element.

The size of the possible insertion region or the respective receiving region can be modified dynamically and set to a maximum value if required. The time period in which the insertion time window is available can be dynamically adjusted in a simple manner depending on the time of arrival of the value document. This provides a control option for synchronizing the dynamic receiving region size or stacker wheel compartment size to the incoming value documents. The region or the time window in which no stacker wheel compartment is available for insertion is reduced, as the closing of the previous receiving region and the opening of the subsequent receiving region is performed dynamically by the elastic return of the deflected stacker wheel segment to its starting position.

All value documents, especially those that arrive at the stacker wheel outside of a certain expected time period (asynchronous value documents), can be stacked correctly. This ensures that the sequence of the value documents is maintained during stacking, which is important in so-called header card operation. When used in a value document stacker, this can lead to the elimination of reasons for rejection (so-called reject reasons) that are related to the incorrect arrival time of the value documents at the stacker unit (e.g. asynchronously fed value documents, etc.).

The invention also relates to a method for stacking value documents with a stacking device, as described above and below.

BRIEF DESCRIPTION OF THE DRAWINGS

Further features of the invention can be found in the claims, the figures and the following description of the figures, in which:

DETAILED DESCRIPTION OF VARIOUS EMBODIMENTS

The illustrations in the figures are schematic and not to scale. If the same reference signs are used in different figures in the following description of the figures, these denote like or similar elements. However, like or similar elements may also be denoted by different reference signs.

Figure 1:
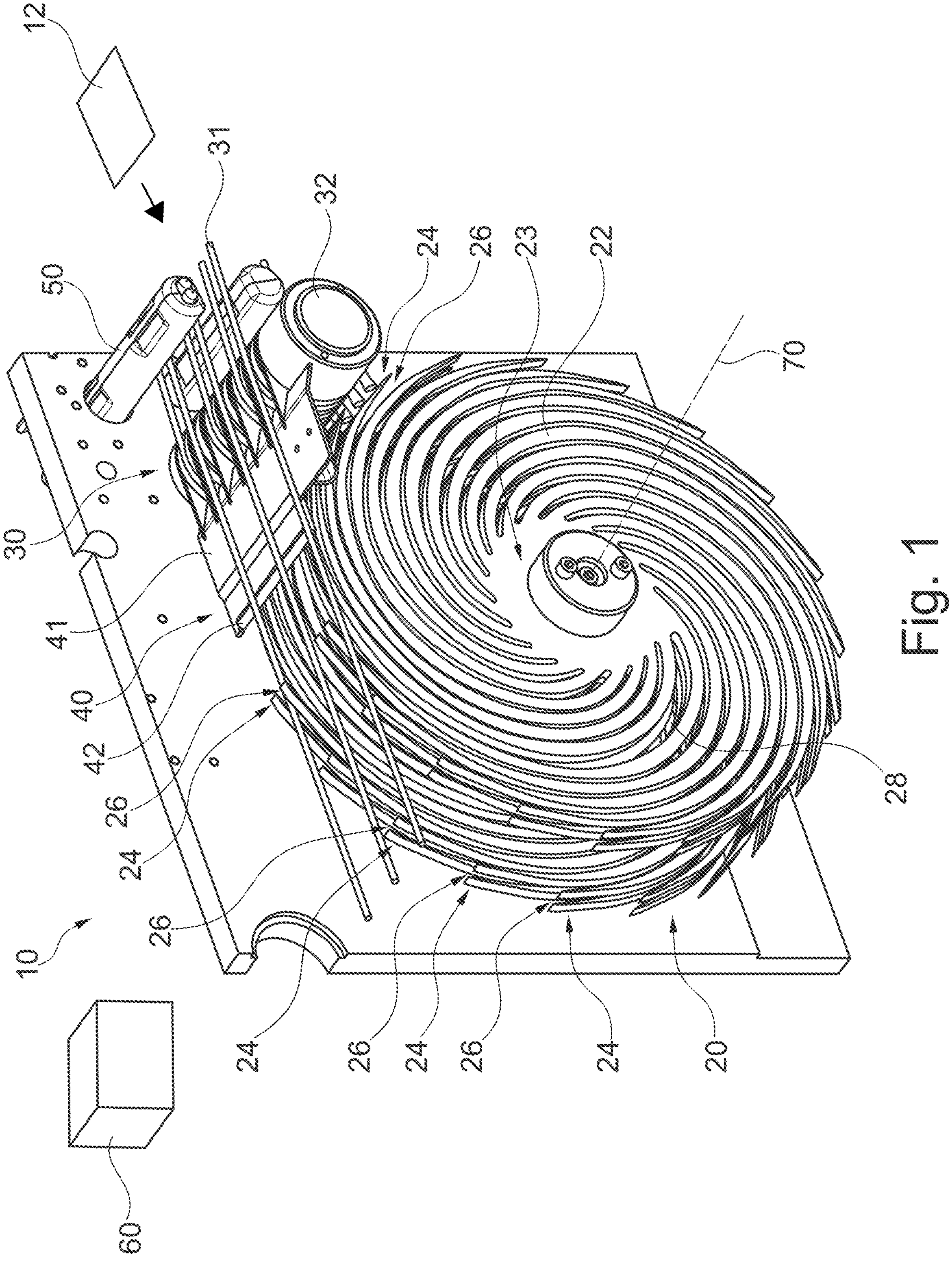
FIG. 1 shows a perspective view of a device for stacking value documents according to an exemplary embodiment.

FIG. 1 shows a perspective view of a device 10 for stacking value documents 12, e.g., banknotes. The device 10 comprises a stacker unit 20 for stacking the value documents 12 and a conveyor unit 30 for conveying the value documents 12 into the stacker unit 20. The value documents 12 are fed to the device 10 one after the other at high speed. The conveyor unit 30 has transport means which, in the example shown here, comprise conveyor belts 31 and one or more conveyor belt rollers 32. The conveyor belts or bands 31 can be arranged in two layers, wherein an upper layer is arranged above the value document 12 and a lower layer is arranged below the value document 12, while the value document 12 is moved in the conveyor unit 30 to the stacker unit 20. In other words, the conveyor belts or bands 31 grip the value document 12 on both sides in order to convey it to the stacker unit 20. Only the portion of the conveyor unit 30 or the conveyor belts 31 just before the stacker unit 20 is shown in the illustration shown. The upper layer of the conveyor belts or bands 31 can extend further above the stacker unit 20. The lower layer of the conveyor belts or bands 31 can branch off downwards around the conveyor belt roller 32, so that the value documents 12 continue to be guided by a guide element 41 after passing the conveyor belt roller 32.

The stacker unit 20 is designed to receive the value documents 12 and for this purpose has a rotatable stacker wheel 22, or a stacker wheel that rotates during operation of the device, with a plurality of receiving regions 26 into which the value documents 12 are inserted one after the other. In FIG. 1, only some of these receiving regions 26 are marked for illustration purposes. The rotating stacker wheel 22 further comprises a plurality of deflectable stacker wheel segments 24, which are provided spaced apart from one another along a circumference of the rotating stacker wheel 22. Again, only some of the stacker wheel segments 24 are labeled for illustrative purposes. The deflectable stacker wheel segments 24 extend away from the interior of the stacker wheel 22 with a radial directional component and a circumferential directional component. The deflectable stacker wheel segments 24 may be elastically deformable, thereby enabling deflection of the stacker wheel segments 24 from their non-deflected state to a deflected state and back. The deflectable stacker wheel segments 24 each define one of the receiving regions 26. For example, two adjacent deflectable stacker wheel segments 24 define an intermediate receiving region 26.

The receiving regions 26 form the region into which the value documents 12 are inserted individually during operation of the device 10. It may be provided that only a single value document 12 is inserted into the respective receiving region 26 and that another value document 12 is not inserted into this one receiving region 26 until the next rotation of the stacker wheel 22. The receiving region 26 can form an entry opening which has an access for the value document 12 to a stacker wheel compartment 28. Each receiving region 26 forms the outer end of a stacker wheel compartment 28 into which the individual value documents 12 are inserted for stacking. The stacker wheel compartments 28 can be formed in a spiral shape in the stacker wheel 22, as can be clearly seen in FIG. 1. The rotating stacker wheel 22 comprises an axis of rotation 70 fixed to a base plate (see FIG. 1) of the device 10, about which the stacker wheel 22 can rotate continuously.

The device 10 also has a deflecting unit 40, which is designed to deflect the stacker wheel segments 24 individually one after the other in order to thus modify the size of a respective receiving region 26 associated with a stacker wheel segment 24. The deflecting unit 40 has a movable deflection element 42, which is movable relative to the device 10. The movable deflection element 42 is arranged adjacent to the guide element 41 and is rotatably attached thereto. The guide element 41 can also be fixed to the base plate shown in FIG. 1. In the configuration shown in FIG. 1, the deflection element 42 can be moved or deflected in the direction of the inside of the stacker wheel 23 in order to deflect a stacker wheel segment 24 moving past the deflecting unit 40 in the direction of the inside of the stacker wheel 23. This reduces a distance between the stacker wheel segment 24 and the fixed axis of rotation 70, which in turn increases the receiving region 26 associated with the stacker wheel segment 24, which is located above an upwardly directed outer side of the stacker wheel segment 24. This relationship will be explained in greater detail.

The device also has a control unit 60, which is designed to control the deflecting unit 40 in order to deflect the stacker wheel segments 24 arriving at the deflecting unit 40 during rotation, possibly as a function of a time delay of the respective value document 12. For this purpose, the control unit 60 can be coupled via a wired and/or wireless signal connection to an actuator of the deflecting unit 40, which is mounted on the rear side of the base plate shown in FIG. 1 (not visible in the figures).

The device 10 optionally has a detection unit 50, which may be provided in the form of a light barrier. The detection unit 50 provides information about the time delay of one or more value documents 12, which is then used by the control unit 60 to decide whether a deflection of a stacker wheel segment 24 should or should not take place and, if applicable, by what deflection distance the stacker wheel segment 24 should be deflected. The control unit 60 can therefore also control the deflecting unit 40 in such a way that the stacker wheel segment 24 that has just moved past the deflecting unit 40 is deflected by a predetermined deflection distance, wherein the predetermined deflection distance is dependent on the detected time delay of the relevant value document 12. The time delay of the value document 12 is considered in comparison to an expected arrival time of the respective value document at the detection unit 50.

Figure 2:
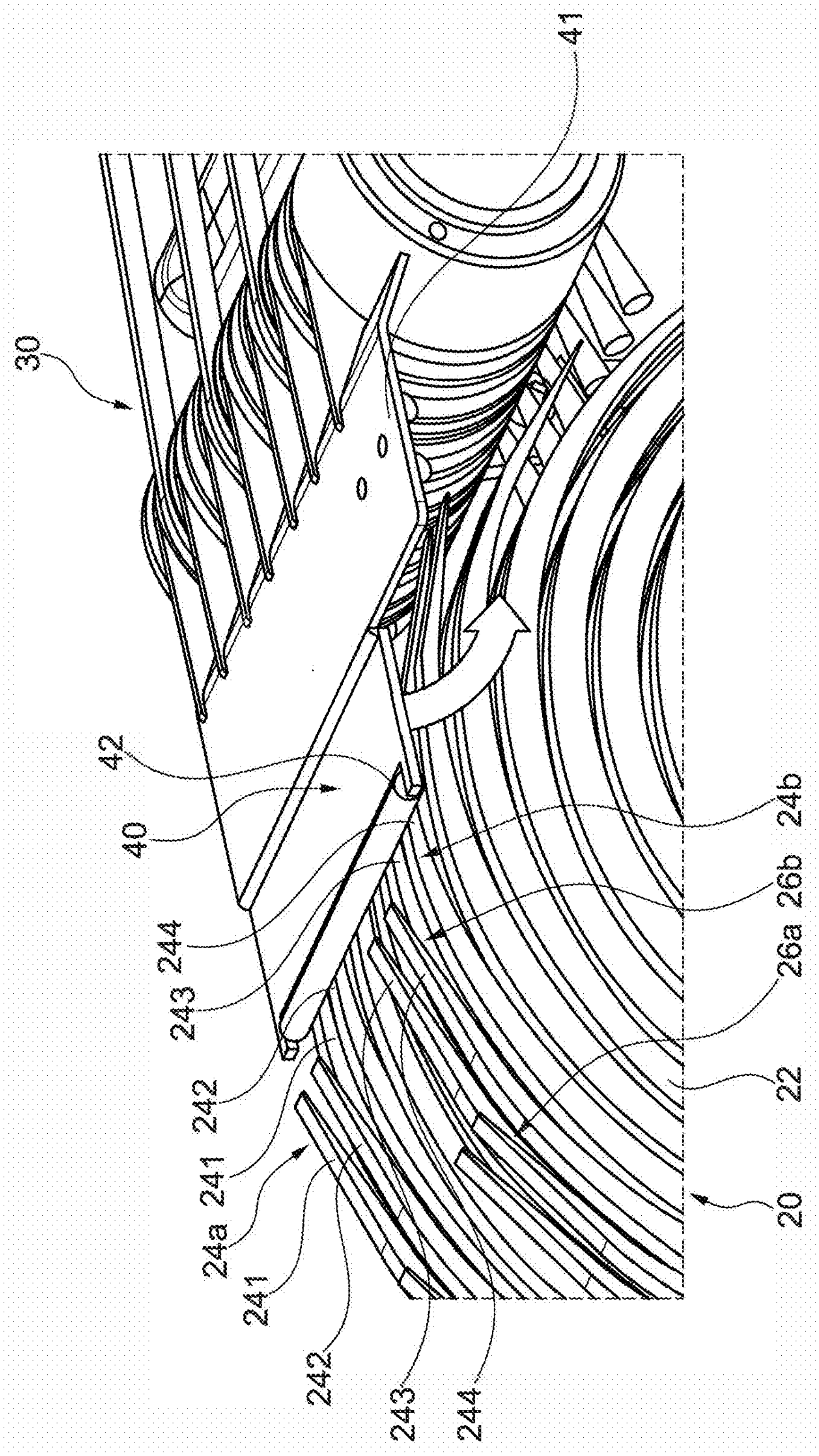
FIG. 2 shows a detailed perspective view of a deflection element of the device of FIG. 1 according to an exemplary embodiment.

FIG. 2 shows a detailed perspective view of the deflection element 40 of the device 10 of FIG. 1. The deflection element 42 can have a movable plate which is rotatably attached to the guide element 41. The deflection element 42 then has a free end which can be moved in the direction of the stacker wheel 22 in order to finally deflect the stacker wheel segment **24*b* which is moving past at this time. The deflection element 42 can be actuated by an actuator, e.g. mechanically or magnetically, in order to be moved downwards. The arrow drawn in FIG. 2 indicates the direction of movement of the deflection element 42** when it is deflected.

FIG. 2 shows a first stacker wheel segment **24*a* with a first associated receiving region 26*a* and a second stacker wheel segment 24*b* with a second associated receiving region 26*b*. The second receiving region 26*b* is formed by an outer side 27*b* or rear side 27*b* of the second stacker wheel segment 24*b* and a freely movable end 25*a* or by the inner side of the first stacker wheel segment 24*a* (see FIG. 3). At the moment shown in FIG. 2, the first stacker wheel segment 24*a* has already been moved past the deflecting unit 24 immediately before the second stacker wheel segment 24*b*. FIG. 2 thus shows the moment of deflection of the second stacker wheel segment 24*b*, which is thus pressed in the direction of the inside of the stacker wheel. In the process, the deflection element 42 comes into contact with the second stacker wheel segment 24*b* and thereby exerts a force on the second stacker wheel segment 24*b* to push it in the direction of the inside of the stacker wheel. In order to minimize wear both on the free ends of the stacker wheel segments 24 and on the deflection element 42, a free-running roller can be provided at the end of the deflection element 42**.

As can also be seen in FIG. 2, each stacker wheel segment **24*a*, 24*b* has one or more stacker wheel fingers 241, 242, 243, 244. When an individual stacker wheel segment 24*a*, 24*b* is deflected, the deflection element 42 simultaneously deflects all stacker wheel fingers 241, 242, 243, 244 of the respective stacker wheel segment 24*a*, 24*b* moved past the deflection element 42 in order to thus increase a size of the respective associated receiving region 26*a*, 26*b*. At the moment shown in FIG. 2, the second stacker wheel segment 24*b* and thus all stacker wheel fingers 241, 242, 243, 244 of the second stacker wheel segment 24*b* are deflected by the deflection element 42. This deflection increases the distance between the free ends of the stacker wheel fingers 241, 242, 243, 244 of the first stacker wheel segment 24*a* and the outer sides or rear sides of the stacker wheel fingers 241, 242, 243, 244 of the second stacker wheel segment 24*b*, which results in the second receiving region 26*b*, in particular its entry opening, being enlarged. This in turn results in the second receiving region 26*b* remaining open for a longer time for a value document 12 to be fed in. As a result, a value document 12 that arrives delayed or late at the second receiving region 26*b* can still safely enter the second receiving region 26*b***, which remains open.

With reference to FIG. 2, it should also be noted that, in a particular exemplary embodiment, the deflecting unit 40 can deflect the first stacker wheel segment **24*a* and the second stacker wheel segment 24*b* in succession such that the size of the first receiving region 26*a* when the first stacker wheel segment 24*a* is deflected differs from the size of the second receiving region 26*b* when the second stacker wheel segment 24*b* is deflected. In other words, the deflecting unit can individually adjust the respective size of the receiving regions 26***a*, 26*b* to be set. Thus, each stacker wheel segment 24*a*, 24*b* can be deflected by a different distance.

Figure 3:
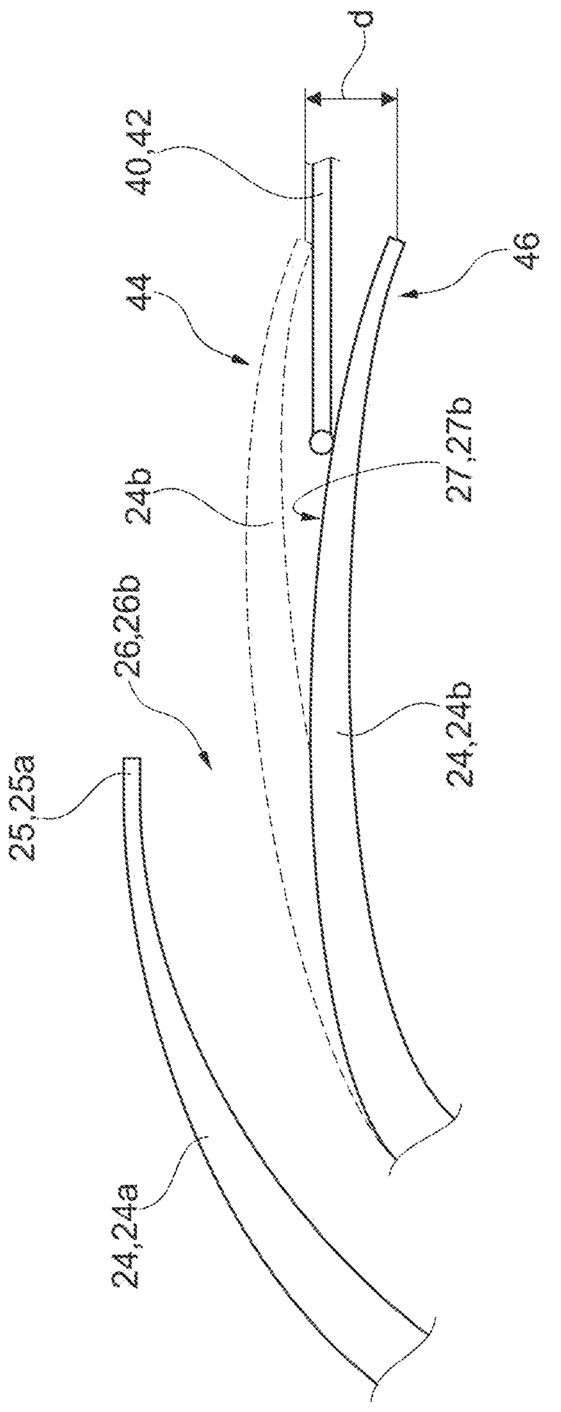
FIG. 3 shows a deflection of a stacker wheel segment in a side view according to an exemplary embodiment.

In FIG. 3, the deflection of the second stacker wheel segment 24*b* by the deflection element 42 of the deflecting unit 40, as described above, is now shown in greater detail in a side view. In particular, the first stacker wheel segment 24*a* and the second stacker wheel segment 24*b* are each shown at least partially in FIG. 3. Between the first stacker wheel segment 24*a* and the second stacker wheel segment 24*b* is the second receiving region 26*b* associated with the second stacker wheel segment 24*b*. It can be seen that a part of the outer side or front side 27*b* of the second stacker wheel segment 24*b* together with the inner side or free end 25*a* of the first stacker wheel segment 24*a* defines the second receiving region 26*b*. Due to the illustrated deflection of the second stacker wheel segment 24*b*, the second receiving region 26*b* can be enlarged, leaving more time for the value document to be fed (not shown) to reach the second receiving region 26*b*.

FIG. 3 shows the second stacker wheel segment 24*b* in the deflected state 46 (solid line) and also in a non-deflected state 44 (dashed line). The non-deflected state 44 corresponds to the state that the second stacker wheel segment 24*b* would assume if it were not deflected by the deflection element 42 of the deflecting unit 40. This means that the non-deflected state 44 corresponds to the starting position or normal position of the second stacker wheel segment 24*b*. The deflection of the second stacker wheel segment 24*b* from the non-deflected state 44 to the deflected state 46 leads to an elastic bending or deformation of the second stacker wheel segment 24*b*, as a result of which the second stacker wheel segment 24*b* is displaced by a deflection distance d in the direction of the inside of the stacker wheel (not shown here). The deflection distance d can, for example, define a radial displacement of the free end of the second stacker wheel segment 24*b* with respect to the rotating stacker wheel 22.

The control unit 60 already described with reference to FIG. 1 can be designed to control the deflecting unit 40 in order to deflect the second stacker wheel segment 24*b* by a predetermined deflection distance d. The predetermined deflection distance d depends on the detected position of the value document 12, as determined by the detection unit 50, which has also already been described, before it enters the stacker unit 20 (see FIG. 1). In this case, the control unit 60 can control the deflecting unit 40 in such a way that the deflection element 42 of the deflecting unit 40 is transferred to a deflected state by a specific angle corresponding to the deflection distance d, in order thus to deflect the second stacker wheel segment 24*b* shown in FIG. 3 by the predetermined deflection distance d if it has been determined that the value document 12 arrives delayed in the receiving region 26*b*. The deflection distance d can thus be set as a function of the time delay of the value document 12 in the conveyor unit 30. For example, the delay is determined on the basis of the arrival of the front edge 13 of the value document 12 (see FIG. 1) at the detection unit 50.

Figure 4:
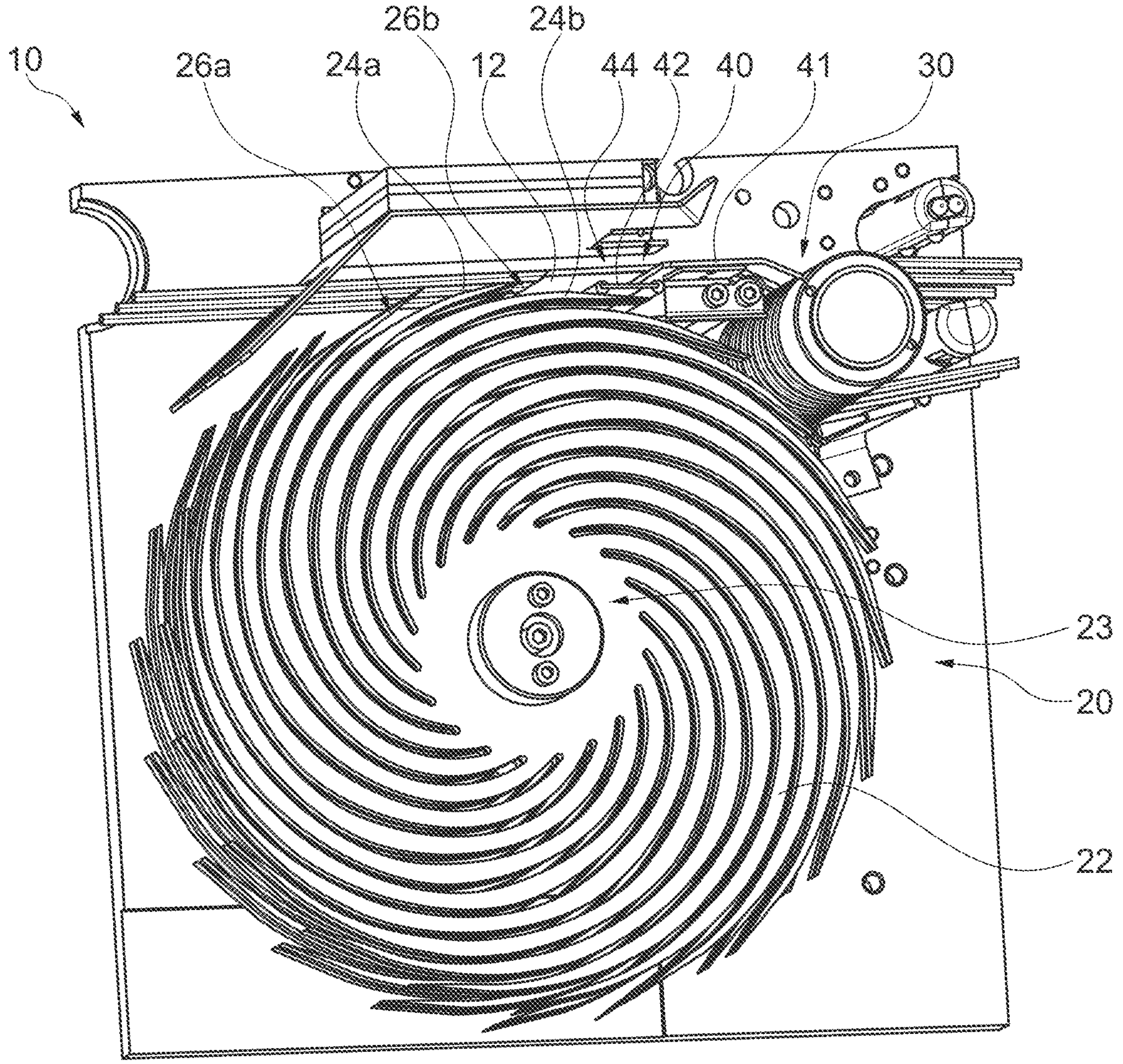
FIG. 4 shows a perspective view of a device for stacking value documents with a static deflection element according to an exemplary embodiment
Figure 5:
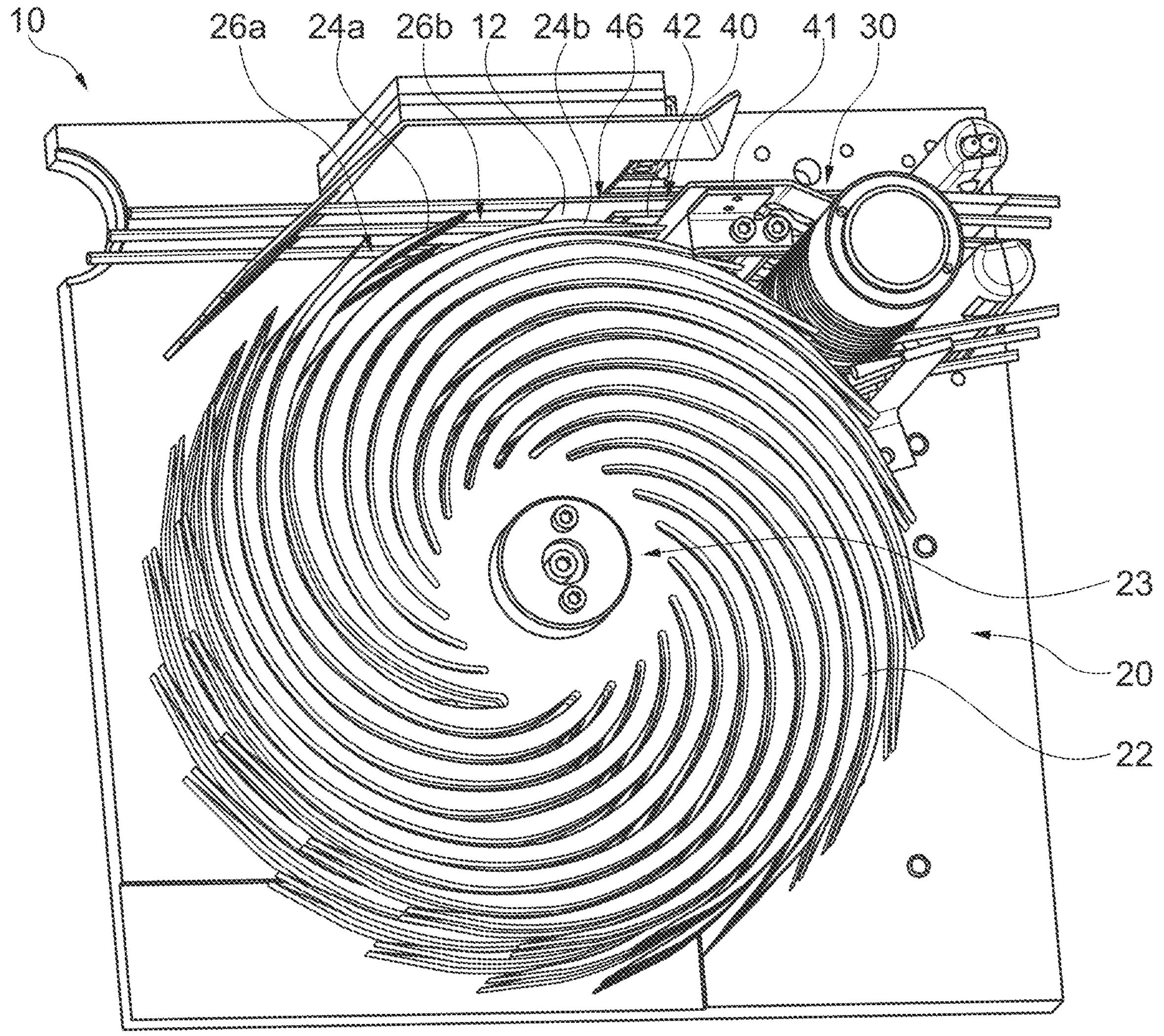
FIG. 5 shows a perspective view of a device for stacking value documents with the static deflection element from FIG. 4 when a stacker wheel segment is deflected according to an exemplary embodiment.

FIGS. 4 and 5 each show a perspective view of the device 10 of FIG. 1 with a statically arranged deflection element 42 of the deflecting unit 40. During operation of the device 10, the position of the static deflection element is fixed. FIG. 4 shows a point in time at which the value document 12 has just left the conveyor unit 30 and entered the stacker unit 20. In particular, FIG. 4 shows the statically arranged deflection element 42, wherein the second stacker wheel segment 24*b*, which is just approaching the deflection element 42, is still in the non-deflected state 44. This means that the second stacker wheel segment 24*b* has not yet reached the deflection element 42 and is thus immediately before contact with the deflection element 42. The first stacker wheel segment 24*a*, which has already passed the deflection element 42, has elastically returned to its normal position after its deflection and is therefore also in a non-deflected state. In this state or at this point in time, the size of the first receiving region 26*a* and the size of the second receiving region 26*b* are still the same, since none of the stacker wheel segments 24*a*, 24*b* associated with these receiving regions 26*a*, 26*b* is deflected. Both stacker wheel segments 24*a*, 24*b* are virtually in their undeformed starting position.

However, the deflection element 42 is arranged such that the second stacker wheel segment 24*b* will come into contact with the deflection element 42 at a certain point in time, thereby deflecting the second stacker wheel segment 24*b*. In other words, the deflection element 42 is fixedly mounted in the device 10 such that it contacts all the stacker wheel segments 24 of the stacker wheel 22, one after the other during the stacker wheel rotation, for a certain period of time in order to deflect the respective passing stacker wheel segment 24. However, since the deflection element 42 is fixedly mounted in the device 10 and cannot move itself, each stacker wheel segment 24 undergoes the same deflection. This means that each stacker wheel segment 24 is deflected by the same deflection distance in the direction of the inner region 23 of the stacker wheel 22.

The position of the static deflection element 42 can be non-adjustable or adjustable, but can be permanently preset. This presetting can be carried out, for example, when the operation of the device 10 is interrupted in order to find an optimum position of the deflection element 42. The setting can be made manually or automatically.

FIG. 5 shows a point in time at which the value document 12 has just left the conveyor unit 30 and enters the stacker unit 20 of the device 10. In particular, FIG. 5 shows the statically arranged deflection element 42 at a point in time immediately following the point in time shown in FIG. 4, wherein the second stacker wheel segment 24*b* moving past is now in the deflected state 46. This means that the second stacker wheel segment 24*b* has reached the deflection element 42 in the meantime and is thus in contact with the deflection element 42. The first stacker wheel segment 24*a* has already passed the deflection element 42 and is still in a non-deflected state. In this state or at this point in time, the size of the first receiving region 26*a* and the size of the second receiving region 26*b* are different, since the second stacker wheel segment 24*b* associated with the second receiving region 26*b* is in the deflected state 46 and the stacker wheel segment 24*a* associated with the first receiving region 26*a* is not deflected.

Figure 6:
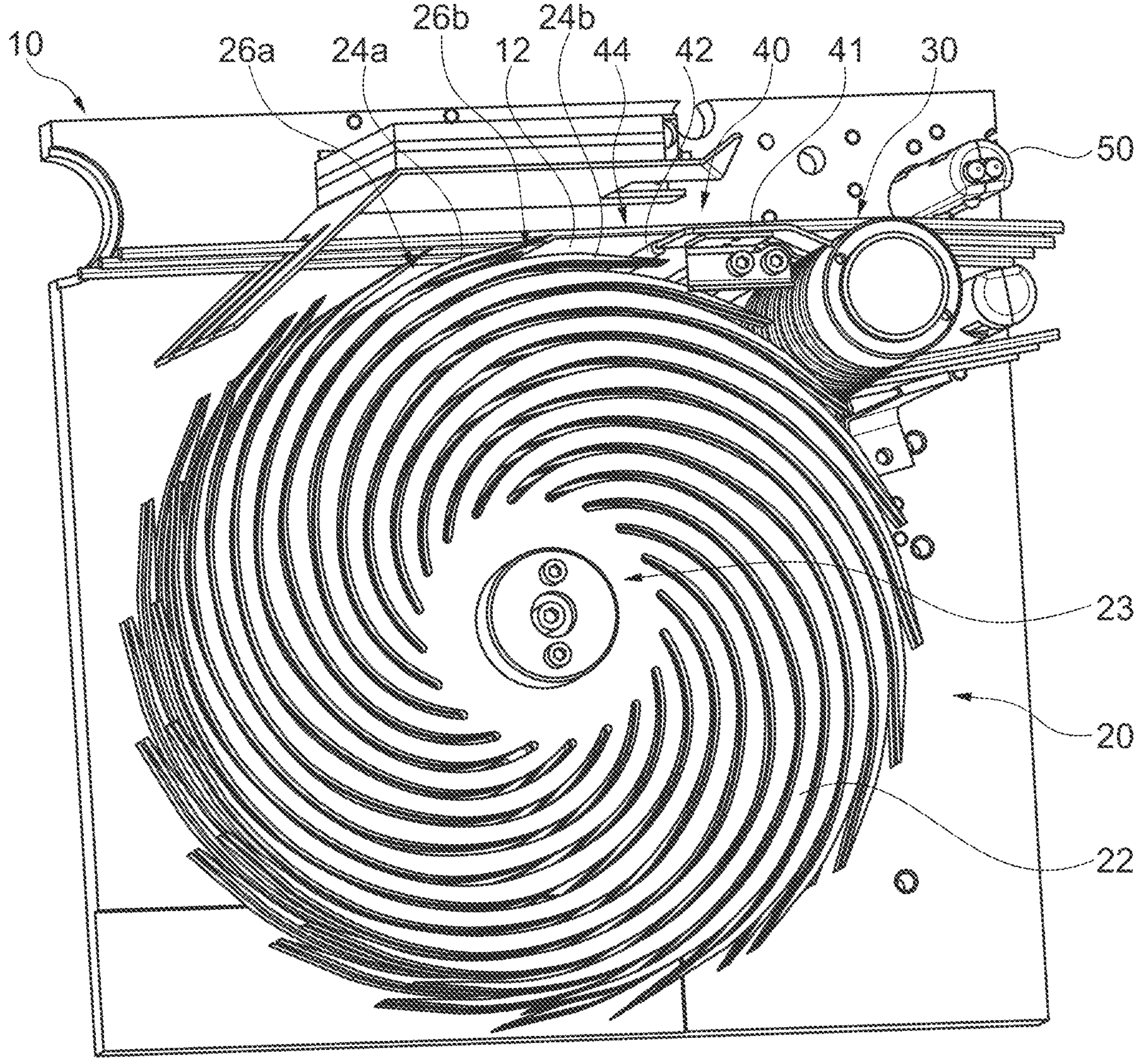
FIG. 6 shows a perspective view of a device for stacking value documents with a dynamically movable deflection element according to an exemplary embodiment.
Figure 7:
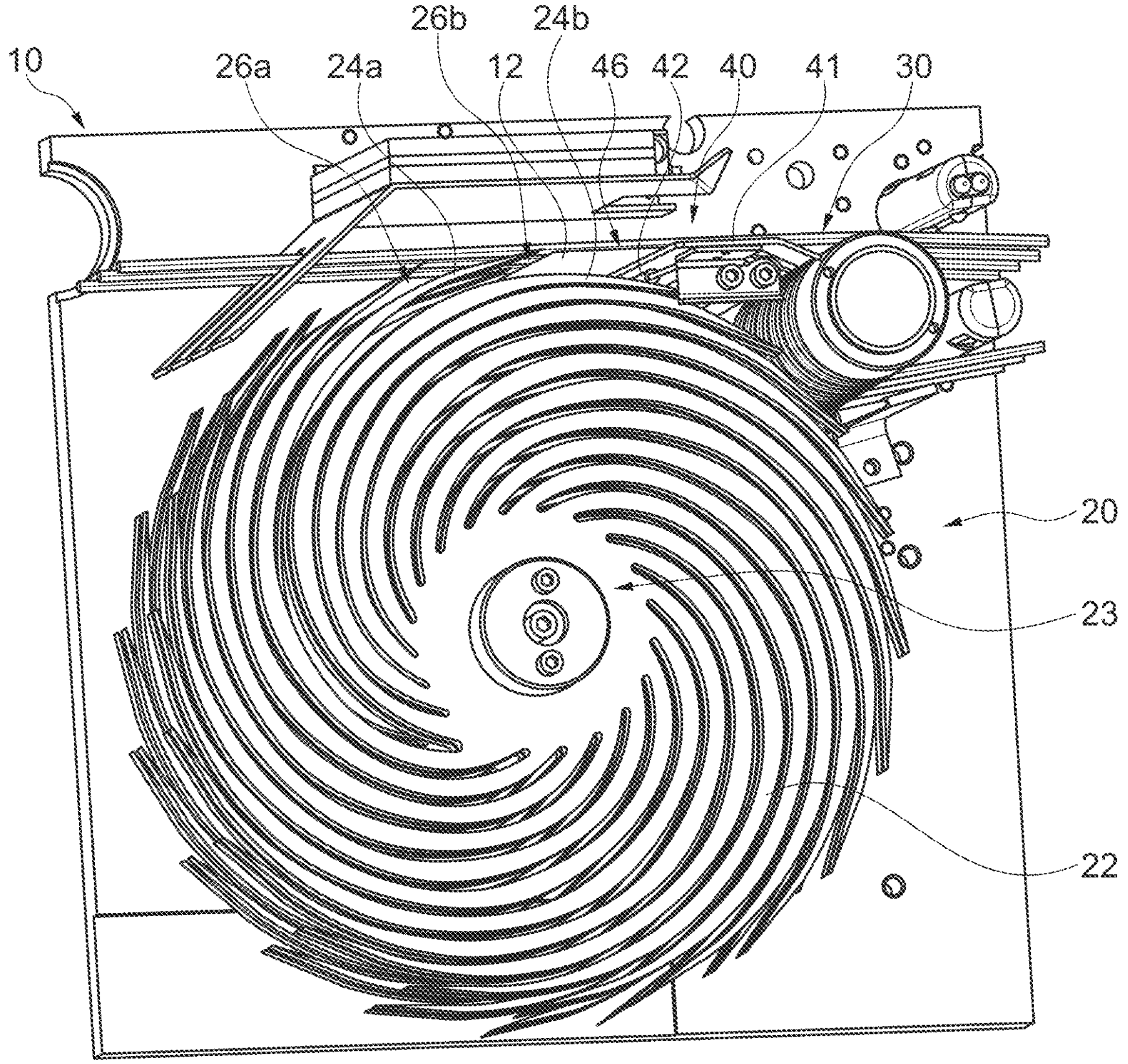
FIG. 7 shows a perspective view of a device for stacking value documents with the dynamically movable deflection element from FIG. 6 when a stacker wheel segment is deflected, according to an exemplary embodiment.

FIGS. 6 and 7 each show a perspective view of the device 10 of FIG. 1 with a dynamically movable deflection element 42 of the deflecting unit 40. The exemplary embodiment shown in FIGS. 6 and 7 can be an alternative exemplary embodiment to the exemplary embodiment shown in FIGS. 4 and 5.

FIG. 6 initially again shows a point in time at which the value document 12 is just leaving the conveyor unit 30 and entering the stacker unit 20. In particular, FIG. 6 shows the dynamically movable deflection element 42, wherein the second stacker wheel segment 24*b* moving past is still in the non-deflected state 44. This means that the second stacker wheel segment 24*b* has not yet reached the deflection element 42 and is therefore immediately before contact with the deflection element 42. The first stacker wheel segment

24*a* has already passed the deflection element 42 and is therefore in a non-deflected state. In this state or at this point in time, the size of the first receiving region 26*a* and the size of the second receiving region 26*b* are still the same, since none of the stacker wheel segments 24*a*, 24*b* associated with these receiving regions 26*a*, 26*b* is deflected. Both stacker wheel segments 24*a*, 24*b* are virtually in their undeformed starting position.

In the example shown here, the dynamically movable deflection element 42 is designed to be movable, i.e., to be displaceable or rotatable relative to the guide element 41 or the device 10. At a certain point in time at which the second stacker wheel segment 24*b* is within reach of the deflection element and the first stacker wheel segment 24*a* is out of reach for the deflection element, the deflection element 42 is thus actively moved or displaced or rotated, for example by the control unit 60 described in FIG. 1, in order to thus specifically establish contact with the second stacker wheel segment 24*b*, as a result of which the second stacker wheel segment 24*b* is deflected.

In other words, the deflection element 42 is movably mounted in the device 10 in such a way that it can selectively contact the individual passing stacker wheel segments 24 of the stacker wheel 22 for a certain period of time or not, in order to deflect the respective stacker wheel segment 24 by a deflection distance, e.g., only certain or all stacker wheel segments 24. This deflection distance can be a fixed deflection distance, which is selected identically for each of the deflected stacker wheel segments, or can be selected (stacker wheel segment-) individually. In other words, the decision between deflecting or not deflecting the deflection element 42 can be made dynamically and individually for the respective value document 12. In addition, an angle of the deflection element 42 corresponding to the deflection distance can also be selected individually for the respective value document 12, for example depending on the delay of the respective value document in front of the stacker wheel 22. So that an individual deflection can be impressed on each stacker wheel segment 24, the deflection element 42 is mounted in the device 10 so as to be movable or displaceable or rotatable in steps or continuously. Each stacker wheel segment 24 can then be deflected by a different deflection distance in the direction of the inner region 23 of the stacker wheel 22.

The deflection element 42 can thus be actively dynamically movable by control by means of the control unit 60 in order to select the position of the deflection element 42 individually for the respective value document 12, possibly in dependence on or as a function of the delay of the respective value document 12 in front of the stacker wheel 22 determined by the detection unit 50.

In order to determine the fixed deflection distance of the dynamically movable deflection element 42, an optimum position of the deflection element 42 can be determined during test operation of the device 10, in which the stack is formed most reliably by the stacker wheel.

FIG. 7 shows a point in time at which the value document 12 has just left the conveyor unit 30 and enters the stacker unit 20 of the device 10. In particular, FIG. 7 shows the dynamically movable deflection element 42 at a point in time immediately following the point in time shown in FIG. 6, wherein the second stacker wheel segment 24*b* moving past is now in the deflected state 46. This means that the second stacker wheel segment 24*b* has reached the deflection element 42 in the meantime and is thus in contact with the deflection element 42. The first stacker wheel segment 24*a* may also have been deflected or not, but is in any case in the non-deflected state at this point in time. In this state or at this point in time, the size of the first receiving region 26*a* and the size of the second receiving region 26*b* are different, since the stacker wheel segment 24*b* associated with the second receiving region 26*b* is deflected and the stacker wheel segment 24*a* associated with the first receiving region 26*a* is not deflected.

The invention claimed is:

1. A device for stacking value documents, comprising:

a stacker unit for receiving the value documents;

a conveyor unit for conveying the value documents into the stacker unit;

wherein the stacker unit comprises a rotatable stacker wheel for receiving the value documents;

wherein the rotatable stacker wheel has a plurality of deflectable stacker wheel segments which are provided along a circumference of the rotatable stacker wheel in a mutually spaced manner;

wherein each of the deflectable stacker wheel segments defines a respective receiving region for receiving one of the value documents conveyed into the stacker unit; and a deflecting unit configured to selectively deflect at least one stacker wheel segment to modify a size of the respective receiving region associated with the at least one stacker wheel segment, wherein the deflecting unit comprises a movable deflection element which can be transferred from a non-deflecting state to a deflecting state.

2. The device according to claim 1, wherein the deflecting unit is designed to deflect the stacker wheel segments arranged along the circumference of the rotatable stacker wheel, in particular some or each of the deflectable stacker wheel segments of the rotatable stacker wheel, one after another in time and thereby modify the size of the receiving region associated with the respective stacker wheel segment.

3. The device according to claim 1, wherein the plurality of stacker wheel segments comprises a first stacker wheel segment having a first associated receiving region and a second stacker wheel segment having a second associated receiving region spaced apart from each other along the circumference of the rotatable stacker wheel;

wherein the deflecting unit is designed to deflect the first stacker wheel segment and the second stacker wheel segment differently one after the other in such a way that a size, in particular width, of the first receiving region when the first stacker wheel segment is deflected differs from a size, in particular width, of the second receiving region when the second stacker wheel segment is deflected.

4. The device according to claim 1, wherein the deflecting unit is designed to deflect the deflectable stacker wheel segments in a direction of an inner region of the rotating stacker wheel, in particular with a radial directional component towards an axis of rotation of the stacker wheel.

5. The device according to claim 1, wherein the rotatable stacker wheel has an axis of rotation fixed within the device, and wherein the stacker wheel and thus the deflectable stacker wheel segments provided on the circumference of the stacker wheel can be rotated about the fixed axis of rotation at a predeterminable rotational speed, and wherein the deflecting unit is designed to deflect the deflectable stacker wheel segments relative to the fixed axis of rotation of the rotating stacker wheel in such a way that a distance between the stacker wheel segments and the fixed axis of rotation is reduced.

6. The device according to claim 1, wherein the movable deflection element is configured to contact one of the deflectable stacker wheel segments in the deflecting state in order to deflect said deflectable stacker wheel segment.

7. The device according to claim 1, wherein an outer side of the respective deflectable stacker wheel segment defines a rear delimitation of the respective receiving region, or a delimitation of said respective receiving region following the respective receiving region along a direction of rotation of the stacker wheel, and wherein a stacker wheel segment running ahead of the respective receiving region along the direction of rotation of the stacker wheel defines a front delimitation of the receiving region, or a delimitation of said receiving region running ahead of the respective receiving region along the direction of rotation of the stacker wheel.

8. The device according to claim 1, wherein each stacker wheel segment of the plurality of deflectable stacker wheel segments comprises at least two stacker wheel fingers arranged in particular along a circumference of the stacker wheel at substantially a same azimuthal position of the stacker wheel and spaced apart along an axis of rotation of the stacker wheel;

wherein the deflecting unit is designed to simultaneously deflect the at least two stacker wheel fingers of the respective stacker wheel segment.

9. The device according to claim 1, comprising:

a control unit which is designed to cause the deflecting unit, in particular the movable deflection element, to deflect the respective stacker wheel segment, wherein the control unit is designed in particular to decide for one or more value documents whether or not it the control unit causes the deflecting unit to deflect the respective stacker wheel segment, into the associated receiving region into which the respective value document is conveyed.

10. The device according to claim 9, wherein the control unit is configured to make a decision as to whether or not the control unit causes the deflecting unit to deflect the respective stacker wheel segment as a function of any time delay of the respective value document conveyed into the stacker unit, and possibly as a function of the time delays of further value documents conveyed into the stacker unit before the respective value document.

11. The device according to claim 9, wherein the deflecting unit, in particular the movable deflection element, is designed to deflect the respective stacker wheel segment by a variable deflection distance and the control unit is designed to variably control the deflecting unit in such a way as to deflect the respective stacker wheel segment by the variable deflection distance, wherein the control unit determines the variable deflection distance in particular as a function of any time delay of the respective value document conveyed into the stacker unit and possibly as a function of the time delays of further value documents conveyed into the stacker unit before the respective value document.

12. A value document processing device comprising:

the device for stacking value documents according to claim 1 and a device for separating value documents from an output stack and for feeding the separated value documents to the stacking device.

13. A method for stacking value documents, in particular comprising a device according to claim 1, said method comprising the steps of:

conveying value documents one at a time to a stacker unit comprising a rotating stacker wheel for receiving the value documents, wherein the rotating stacker wheel has a plurality of deflectable stacker wheel segments which are arranged at a distance from one another along a circumference of the rotating stacker wheel, wherein the deflectable stacker wheel segments each define a receiving region for receiving one of the value documents conveyed into the stacker unit, and deflecting one of the stacker wheel segments by means of a deflecting unit in order to modify a size of a receiving region of the stacker wheel associated with the stacker wheel segment, and conveying one of the value documents conveyed to the stacker unit into the stacker unit, in particular into the receiving region of the stacker wheel associated with the respective deflected stacker wheel segment.

14. The method according to claim 13, wherein the deflection of the respective stacker wheel segment increases a size, in particular a width, of the receiving region associated with the respective stacker wheel segment, into which the respective value document is conveyed.

15. A device for stacking value documents, comprising:

a stacker unit for receiving the value documents;

a conveyor unit for conveying the value documents into the stacker unit;

wherein the stacker unit comprises a rotatable stacker wheel for receiving the value documents;

wherein the rotatable stacker wheel has a plurality of deflectable stacker wheel segments which are provided along a circumference of the rotatable stacker wheel in a mutually spaced manner;

wherein each of the deflectable stacker wheel segments defines a respective receiving region for receiving one of the value documents conveyed into the stacker unit; and a deflecting unit configured to selectively deflect each stacker wheel segment to modify a size of the respective receiving region associated with a respective stacker wheel segment, wherein the deflecting unit comprises a movable deflection element which can be transferred from a non-deflecting state to a deflecting state, and wherein the device further comprises a control unit which is designed to cause the deflecting unit, in particular the movable deflection element, to deflect the respective stacker wheel segment.

16. The device according to claim 15, wherein the control unit is further designed to decide for one or more value documents whether or not the control unit causes the deflecting unit to deflect the respective stacker wheel segment into the respective receiving region into which the respective value document is conveyed.

17. The device according to claim 1, wherein the deflecting unit is configured to selectively deflect each stacker wheel segment individually and to modify the size of the respective receiving region associated with each respective stacker wheel segment.

* * * * *